Jan. 20, 1953  M. B. CHAPPEL  2,625,727
CLIP FOR BICYCLE HANDLE BARS
Filed March 3, 1950  2 SHEETS—SHEET 1

Inventor
Mary Berger Chappel
By Patrick J. Beavers
Attorney

Jan. 20, 1953  M. B. CHAPPEL  2,625,727
CLIP FOR BICYCLE HANDLE BARS
Filed March 3, 1950  2 SHEETS—SHEET 2
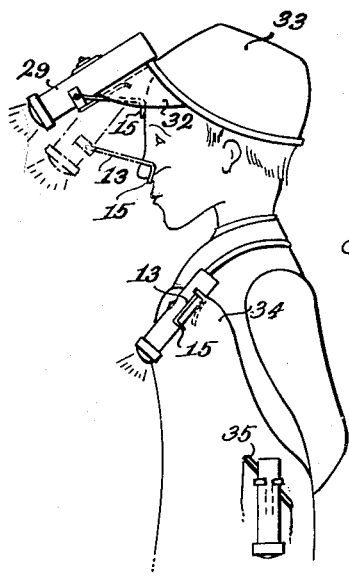
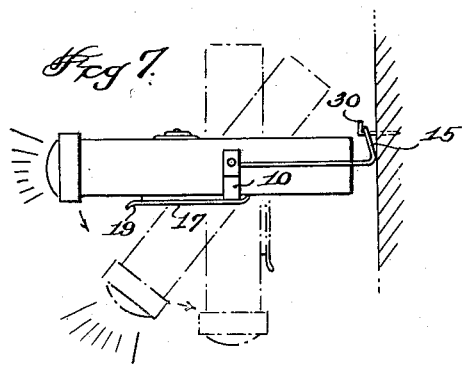
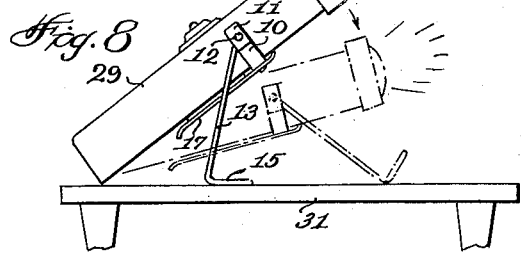
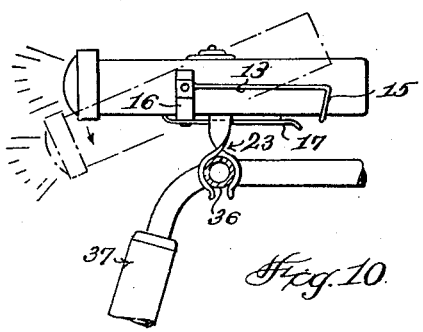
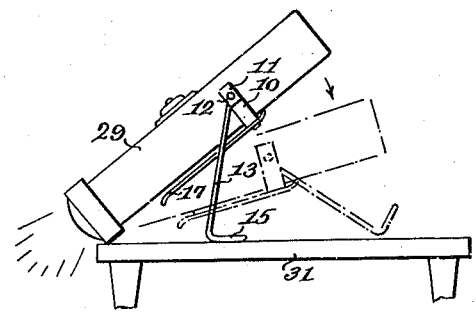
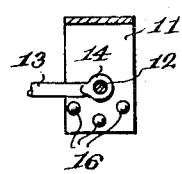
Inventor
Mary Berger Chappel
By Patrick D. Beavers
Attorney Patented Jan. 20, 1953

2,625,727

UNITED STATES PATENT OFFICE 2,625,727

CLIP FOR BICYCLE HANDLE BARS

Mary Berger Chappel, Tucson, Ariz.

Application March 3, 1950, Serial No. 147,549

1 Claim. (Cl. 24—259)

The present invention relates to an adjustable flashlight holder and it consists in the combinations, constructions and arrangements of parts herein described and claimed.

Generally the invention comprises a flashlight holder which consists of an open collar of flat spring metal whose ends are bent outwardly and rearwardly to form ears which are spaced from the body of the collar but connected thereto by pins upon each of which is journaled a shaft. The shafts are integrally interconnected at their outer ends by a perpendicularly extending semi-cylindrical support member. Novel means is provided for holding the shafts at varying angles with respect to the collar. A flat spring clip is affixed centrally to the outer side of the collar and is provided at its outer end with a lip adjacent which is a hole. Another portion of the invention is a flat piece of spring metal formed at its outer ends into an open ended spring clip and having its central portion twisted to form a flat topped loop for receiving the flat spring clip. The top of the flattened loop and the inner side of the flat spring clip are each provided with a covering of rubber whereby to frictionally hold a flashlight against accidental displacement from the holder. The device is capable of a wide variety of uses as will be seen from the detailed description herebelow.

It is accordingly an object of the invention to provide a device of the character set forth which is simple in construction, inexpensive to manufacture and yet efficient and effective in use.

Another object of the invention is the provision, in a device of the character set forth, of novel means for holding a flashlight at preselected angles with respect to a support forming a part of the invention.

Another object of the invention is the provision, in a device of the character set forth, of novel gripping means for a flashlight holder.

A further object of the invention is the provision of a novel bracket for supporting a flashlight in various positions, which bracket forms a part of the invention.

Other and further objects of the invention will become apparent from a reading of the following specification taken in conjunction with the drawings, in which.

Figure 3:
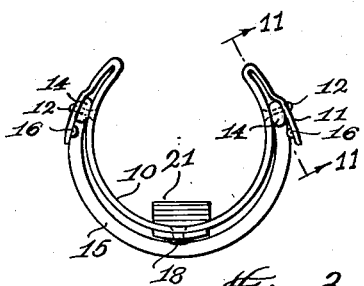
Figure 3 is a sectional view taken along line 3—3 of Figure 1.
Figure 4:
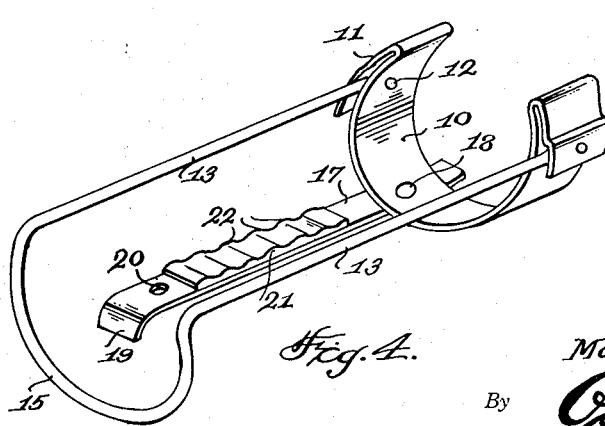
Figure 4 is a perspective view thereof.
Figure 5:
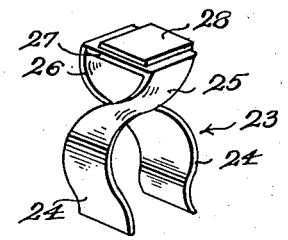

Figure 5 is a perspective view of a clip which may be utilized as a part of the invention, Figure 6 is a view illustrating several methods of utilizing the invention, Figure 7 is a side elevational view illustrating how the invention may be utilized in conjunction with a nail or the like affixed to a wall, Figures 8 and 9 are views similar to Figure 7 but showing certain methods of using the invention upon a horizontal plane surface as, for example, a table, Figure 10 is a side elevational view of the device shown as a support for a flashlight upon the handlebars of a bicycle, in this case utilizing the clip illustrated in Figure 5 as a part of the device, and Figure 11 is an enlarged fragmentary sectional view taken along line 11—11 of Figure 3.

Referring more particularly to the drawings, there is shown therein a flashlight holder comprising a collar 10 formed of flat spring metal and having its outer ends folded outwardly and rearwardly to form ears 11 connected in spaced relation to the body of the collar by means of pins 12. A shaft 13 is journaled upon each of the pins 12 by being looped thereover, as indicated at 14, in Figure 3, and the outer ends of the shafts 13 are integrally interconnected with a semi-circular foot 15 which extends at an angle to the horizontal axes of the shafts 13. It will thus be seen that the shafts 13, their journal portions 14 and the foot 15 are all formed of a single piece of material, preferably wire of spring metal.

Figure 1:
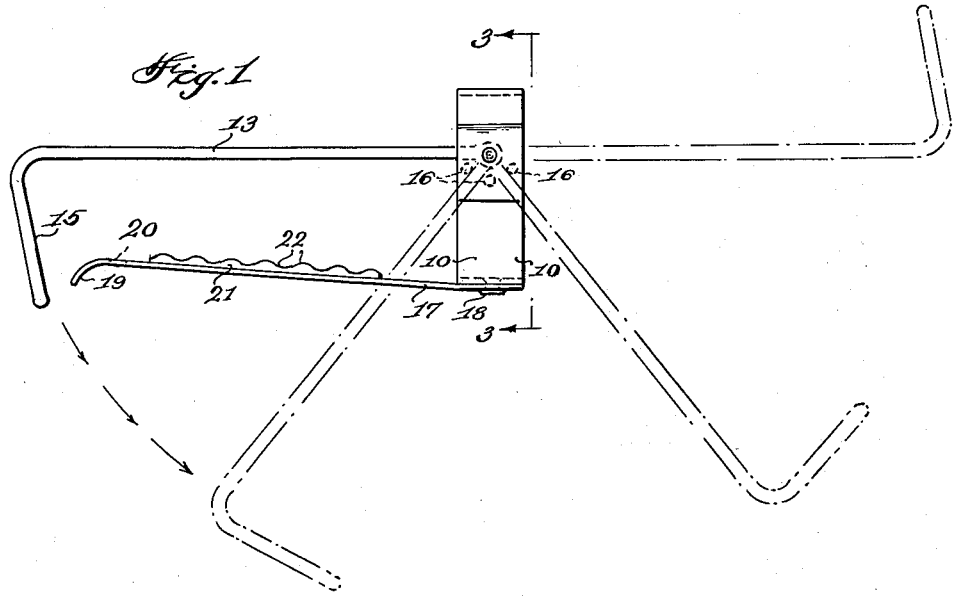
Figure 1 is a side elevational view of an embodiment of the invention.
Figure 2:
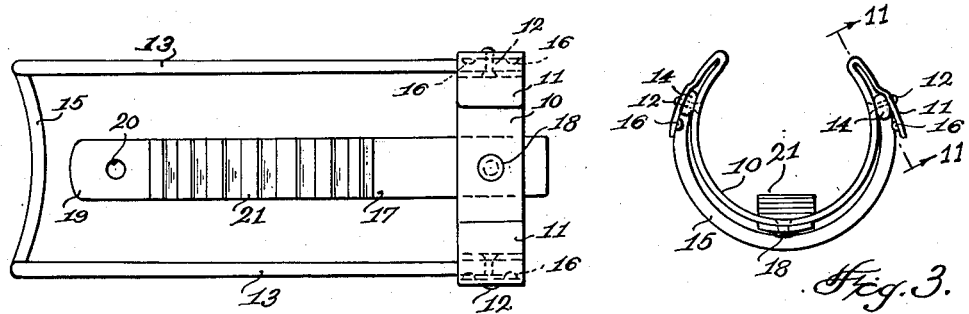
Figure 2 is a plan view thereof.

Bosses 16, preferably three in number, as indicated in Figure 1, extend inwardly from the ears 11 and are arranged in an arcuate fashion about the pins 12. A flat spring metal clip 17 is attached by means of a rivet 18 or the like centrally to the collar 10 and extends in a longitudinal direction therefrom. The clip 17 is provided with a lip 19 at its free end and with a hole 20 adjacent the lip.

The inner face of the clip 17 is provided with a covering of rubber 21 which may be formed into transversely extending ridges, as indicated at 22.

A base clip, generally indicated at 23, and illustrated in Figure 5 of the drawings, is composed of a strip of flat spring metal whose outer ends 24 are formed into an open ended gripping member and whose central portion is twisted, as indicated at 25, to form a loop 26 having a flattened top 27 provided with a covering 28 fastened upon the outer side thereof, the covering being preferably formed of rubber.

In operation, it will be apparent that a flashlight 29 of conventional cylindrical structure may be placed within the collar 10 to be securely gripped thereby and, when so mounted, the clip 17 and its rubber facing 21 will bear against the side of the flashlight. Thereafter the support composed of the shafts 13 and the foot 15 may be utilized in a variety of ways to hold the flashlight 29 in a wide variety of positions.

For example, by placing the 15 over a nail, hook or the like, as indicated at 30 in Figure 7, and then moving the flashlight to any of the angular positions indicated in dotted lines in the figure mentioned, and also by moving the foot 15 axially on the hook 30, it will be seen that the flashlight may be directed in an infinite number of directions. It will also be apparent that the bosses 16 will act to hold the shafts 13 in any of the positions where the shafts 13 may lie between two of such bosses or against either of the outer bosses, as indicated, for example, in Figure 1.

Likewise it will be apparent that the flashlight 29 may be supported in a variety of positions by utilizing the foot 15 and the rearward end of the flashlight itself to support the same upon a horizontal plane surface such as, for example, the table 31 shown in Figures 8 and 9.

Again, it will be apparent that the flashlight may be mounted upon a visor 32 of a hat 33 by utilizing the clip 17 and placing the clip 17 beneath the visor while the flashlight remains upon the cutter side of the visor. In such case the support 13, 15 may be used by placing the foot 15 upon the forehead of the user or, if desired, by placing the foot 15 upon the nose of the user to thereby support the flashlight in a comfortable manner and leaving the hands of the user for other purposes. It will also be seen that the clip 17 may be used to hold the flashlight upon the edge of a garment such as overalls 34 or upon, for example, a pocket 35.

By utilizing the base clip 23 a still further use for the invention may be had. In this case the open ends of the gripping member 24 may be placed on the handlebars 36 of a bicycle 37 and the clip 17 extended through the loop 26. In this manner the flashlight 29 may be directed and held in several positions, as shown, for example, in Figure 10. The rubber coverings 21 and 28 each act to prevent accidental slippage of the flashlight 29 from the collar 10.

While but one form of the invention has been shown and described herein, it will be readily apparent to those skilled in the art that many minor forms thereof may be made without departing from the spirit of the invention or the scope of the appended claim.

What is claimed is:

A resilient clip formed from a rectangular strip of spring steel having a planar central top portion, gripping arms extending downwardly from opposite ends of said planar portion, warped sections extending downwardly from said arms with the adjacent elements of said warped surfaces parallel to each other and to the planar top, and gripping spring arms extending downwardly from said warped surfaces to grasp an object at a right angle to an object to be held by the first arm.

MARY BERGER CHAPPEL.

REFERENCES CITED

The following references are of record in the file of this patent:

UNITED STATES PATENTS

| Number | Name | Date |
| --- | --- | --- |
| 568,121 | Varian | Sept. 22, 1896 |
| 725,586 | Pool | Apr. 14, 1903 |
| 1,354,195 | Jokubaitis | Sept. 28, 1920 |
| 1,363,664 | Livingston | Dec. 28, 1920 |
| 1,895,656 | Gadke | Jan. 31, 1933 |
| 2,052,120 | Vaughan | Aug. 25, 1936 |
| 2,086,102 | Stradling | July 6, 1937 |

FOREIGN PATENTS

| Number | Country | Date |
| --- | --- | --- |
| 109,050 | Australia | Nov. 8, 1932 |